I. PARKE.
Bee-Hive.

No. 203,937. Patented May 21, 1878.

WITNESSES:
C. Neveux
E. Sedgwick

INVENTOR:
I. Parke
BY Munn & Co
ATTORNEYS.

N. PETERS, PHOTO-LITHOGRAPHER, WASHINGTON, D. C.

UNITED STATES PATENT OFFICE.

IRA PARKE, OF MINERAL POINT, MISSOURI.

IMPROVEMENT IN BEE-HIVES.

Specification forming part of Letters Patent No. 203,937, dated May 21, 1878; application filed January 21, 1878.

*To all whom it may concern:*

Figure 1:
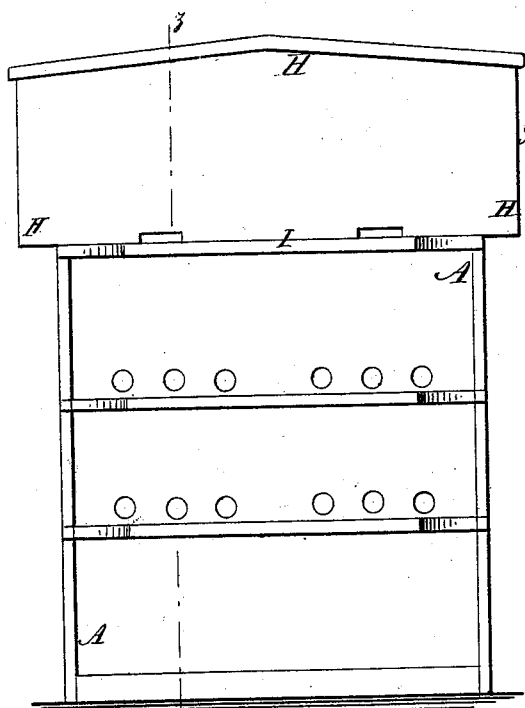
Figure 2:
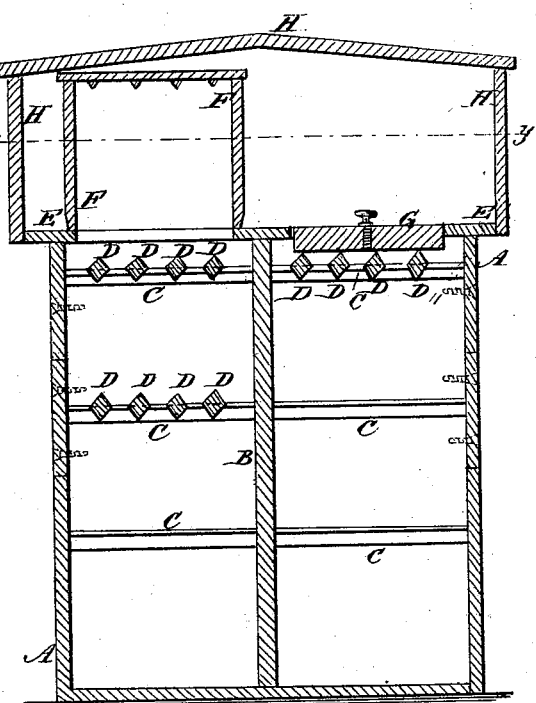
Figure 3:
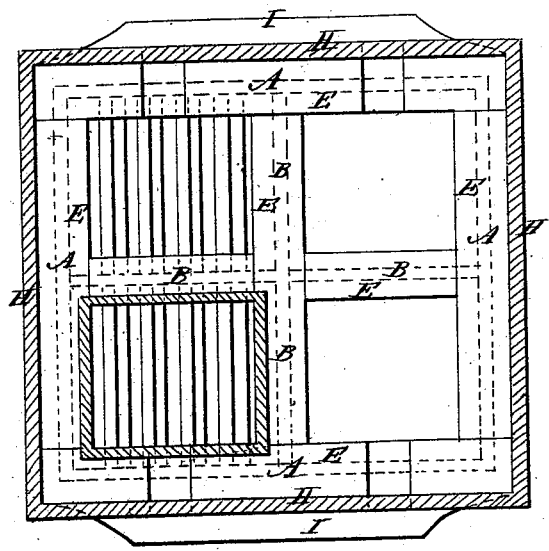
Figure 4:
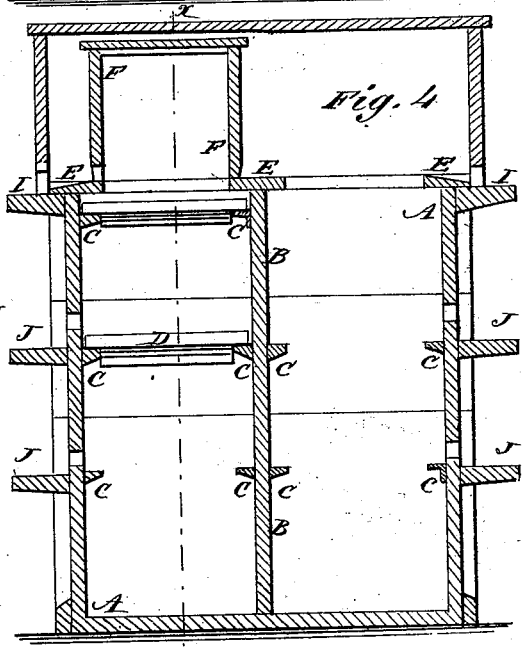

Be it known that I, IRA PARKE, of Mineral Point, in the county of Washington and State of Missouri, have invented a new and useful Improvement in Bee-Hives, of which the following is a specification:

Figure 1 is a front view of my improved bee-hive. Fig. 2 is a vertical section of the same, taken through the line $x\,x$, Fig. 4. Fig. 3 is a horizontal section of the same, taken through the line $y\,y$, Fig. 2. Fig. 4 is a vertical section of the same, taken through the line $z\,z$, Fig. 1.

The object of this invention is to furnish an improved hive for bees, which shall be simple in construction and convenient in use, enabling bees to be managed by inexperienced persons, which will enable the bee-raiser to have his bees swarm or not, which will enable a new hive to be started from an old one, which will lessen the labor of the bees in removing refuse, which will enable the best honey to be removed, and will resist wind, rain, and cold.

Similar letters of reference indicate corresponding parts.

The hive A is designed to be built of lumber an inch thick, and may be three feet eleven inches long, two feet nine inches wide, and three feet high, outside measurement. These measurements, however, are only suggested as forming hives of a convenient size; but I do not wish to limit myself to them, as the hives may be made of any desired size.

The interior of the hive is divided vertically into four equal compartments by vertical partitions B, meeting in the center at right angles. To the opposite sides of each of the four chambers, near their upper edges and at equal distances apart, are attached three pairs of cleats, C, dividing the said chambers into three nearly-equal spaces, the lower space being made a little the higher, to leave space at its bottom to receive the refuse.

Upon the pairs of cleats C are laid the ends of bars D, for the bees to attach their combs to. The bars D are made square, and are kept in diagonal positions by notching the lower corners of their ends, or by attaching flanges or blocks to said ends. With this construction the bees will suspend a comb from each bar D, and any desired bar and its comb may be removed whenever desired. This enables the bee-owner to select the honey and take the best without disturbing the other combs. In order that this may be conveniently done the sides of the hive are made detachable, or are provided with doors to give convenient access to its interior. To the top edges of the walls of the hive A and of the partitions B are attached cap-boards E, to receive the hives F, one of which is placed over each of the compartments of the said hive A. With this construction, as the bees fill the hives they work down into the compartments and fill them, so that it will not be necessary for them to swarm. If it is desired to have them swarm, a horizontal division or bottom board, G, may be placed upon the upper tier of comb-bars D, or upon any other desired tier, to prevent the bees from working down below it.

The hives F are designed to be made in two halves, connected together by dowel-pins and hooks and staples, or other suitable means, and to their tops are attached comb-guides, parallel with the plane of division, to cause the bees to arrange their combs parallel with the said plane of division, so that when the hives are full they may be taken apart, and each full half connected with an empty half, thus enabling a second hive to be started from the first one. Some of the combs from the compartments of the first hive may also be transferred to the second hive, if desired. The hives F are covered with a cap, H, the lower edges of which overlap the outer edges of the top boards E.

The cap H rests upon two flanges, I, attached to the two fronts of the hive, and which also serve as platforms for the bees to alight upon and take flight from. In the upper side of the two front top boards E, in the lower edge of the two fronts of the cap H, and in the lower edges of the fronts of the hives F are made notches to form passage-ways for the bees to and from the said hives F.

In the two fronts of the hive A, just above the lower and middle cleats C, are formed holes to allow the bees to pass directly in and out of the part of the compartments of the hive in which they are working; and to the said fronts, just beneath the said holes, are attached cleats J, to form platforms for the bees to alight upon and take flight from. With this construction the refuse from the bees falls into the bottom of the hive A, and may be allowed to remain there, or may be removed when convenient. Broken pieces of comb may also be scattered over the bottom of the hive A, for the insects that find their way into the said hive to feed upon, to prevent them from ascending to the comb in the upper parts of the compartments.

Having thus fully described my invention, I claim as new and desire to secure by Letters Patent—

A bee-hive having partitions B, cap-boards E H, flanges I, cleats J, and holes just above the cleats leading into the several compartments, as shown and described.

IRA PARKE.

Witnesses:
    HENDERSON P. KIDD,
    LEWIS D. BONE.